W. G. HOAG.
Grain Screen.

No. 37,963.

Patented March 24, 1863.

Witnesses

Inventor
Warren G. Hoag
By atty A. B. Stoughton

UNITED STATES PATENT OFFICE.

WARREN G. HOAG, OF HOOSICK, NEW YORK.

IMPROVEMENT IN GRAIN-SCREENS.

Specification forming part of Letters Patent No. 37,963, dated March 24, 1863.

*To all whom it may concern:*

Be it known that I, WARREN G. HOAG, of Hoosick, in the county of Rensselaer and State of New York, have invented certain new and useful Improvements in Flax and other Seed Cleaners and Separators; and I do hereby declare that the following is a full, clear, and exact description of the construction and operation of the same, reference being had to the accompanying drawings, making a part of this specification, in which—

Figure 3:
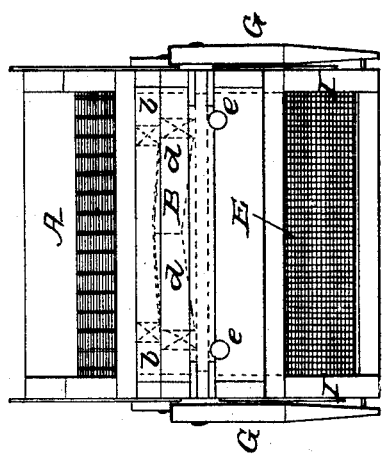
Figure 4:
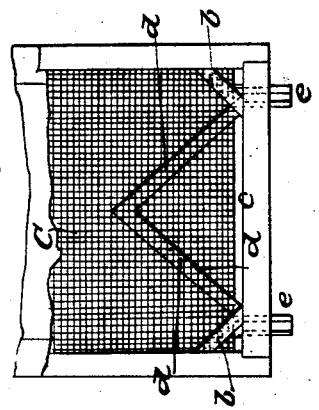
Figure 1:
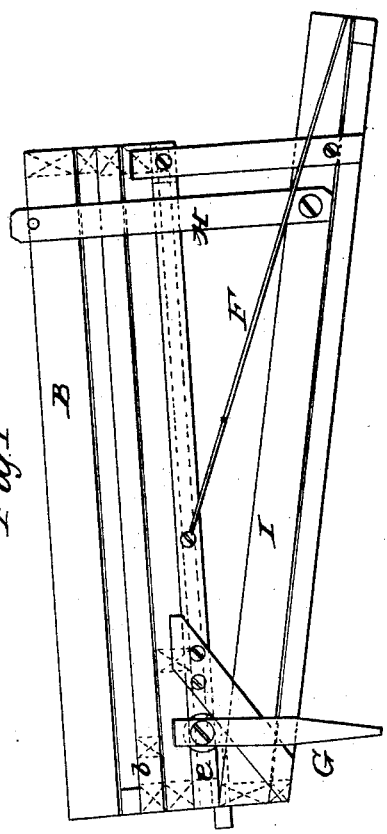
Figure 2:
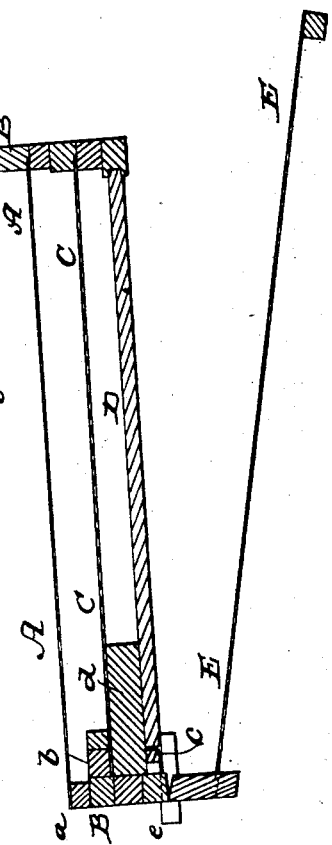

Figure 1 represents a side elevation of the shoe or shaking frame containing the screens or riddles. Fig. 2 represents a longitudinal vertical section through the same. Fig. 3 represents an end view of the shoe and screens, and Fig. 4 represents a top plan of a portion thereof.

Similar letters of reference, where they occur in the several figures, denote like parts of the apparatus in all the drawings.

My invention consists in an arrangement of screens and separating devices in a shaking shoe or frame, for the purpose of cleaning flax-seed or other small seeds and separating the same.

To enable those skilled in the art to make and use my invention, I will proceed to describe the same with reference to the drawings.

The flax or other seeds to be cleaned are dropped from a hopper or otherwise onto the first screen or riddle, A, at its highest end, in the shoe or frame B. This screen or riddle has oblong meshes in it, as shown in Fig. 3. A shake-motion having been communicated to the shoe or frame B in any of the well-known ways, the seeds, chaff, &c., commence to move down over the screen A, the seeds and finer material dropping through the screen onto the second screen, C, of the series, while the coarser material drops off at the end a of the first screen, A. The second riddle of the series, C, is parallel with the first one, A, and inclining in the same direction with it, its meshes, however, being of a square form, as shown in Fig. 4, where the top screen, A, is represented as being removed to show the one, C, underneath it. The seeds and finer material that have dropped through onto the second screen continue, by the shake-motion given to the entire shoe or frame, to descend and at the same time to sift or pass through C onto a directing board or bottom, D, where it continues to descend toward the lower end of the frame. That part of the material which remains on the screen C until it gets to the end of the screen is directed by the oblique boards b b to an opening, c, from whence it drops past the bottom board, D, and onto a lower riddle, E, below the bottom board, and which lower riddle inclines in a direction contrary to that of the upper screens; but the material which drops through the screen C onto the bottom board, D, (which is the perfectly cleaned and separated seeds,) passes along on the bottom board until it arrives at the guiding boards or slats d d, which direct it to the spouts e e, and thence out of the machine to any suitable place of deposit. The material that drops past the bottom board, D, and onto the lowermost screen, E, undergoes a further separation on that screen, which ordinarily finishes the cleaning and separating, unless the offal be rethreshed and recleaned.

F are rods by which the shoe may be connected to a crank to produce the necessary shake-motion, and G are supports for holding up the shoe while it is shaken.

I may or may not use a blast in connection with this shoe, depending upon the kind and condition of the seeds that are to be cleaned and separated by the machine.

J are arms for suspending the frame I of the lower riddle to the frame B of the upper ones.

H are arms pivoted to the lower frame, I, their upper ends being furnished with a hole or other device by which this end of the riddle may be suspended to the frame carrying the hopper or fan-blower, so that the riddle may have a shake-motion independent of the hopper-frame.

Having thus fully described the nature, object, and purpose of my invention, what I claim therein as new, and desire to secure by Letters Patent, is—

The arrangement of the screens A C E and guiding-boards b d D and delivery-points a c e in a frame having a shake-motion, for the purpose of cleaning and separating flax and other small seeds, substantially as herein described and represented.

WARREN G. HOAG.

Witnesses:
W. B. REID,
HENRY HAWKS.